W. B. COOK.
MOVING PICTURE MACHINE.
APPLICATION FILED FEB. 19, 1918.

1,404,013. Patented Jan. 17, 1922.
4 SHEETS—SHEET 1.

INVENTOR
Willard B. Cook
BY
Pennie, Davis, Marvin and Edmonds
his ATTORNEYS

W. B. COOK.
MOVING PICTURE MACHINE.
APPLICATION FILED FEB. 19, 1918.

1,404,013.

Patented Jan. 17, 1922.
4 SHEETS—SHEET 2.

INVENTOR
Willard B. Cook
BY
Pennie, Davis, Marvin & Edmonds
his ATTORNEYS

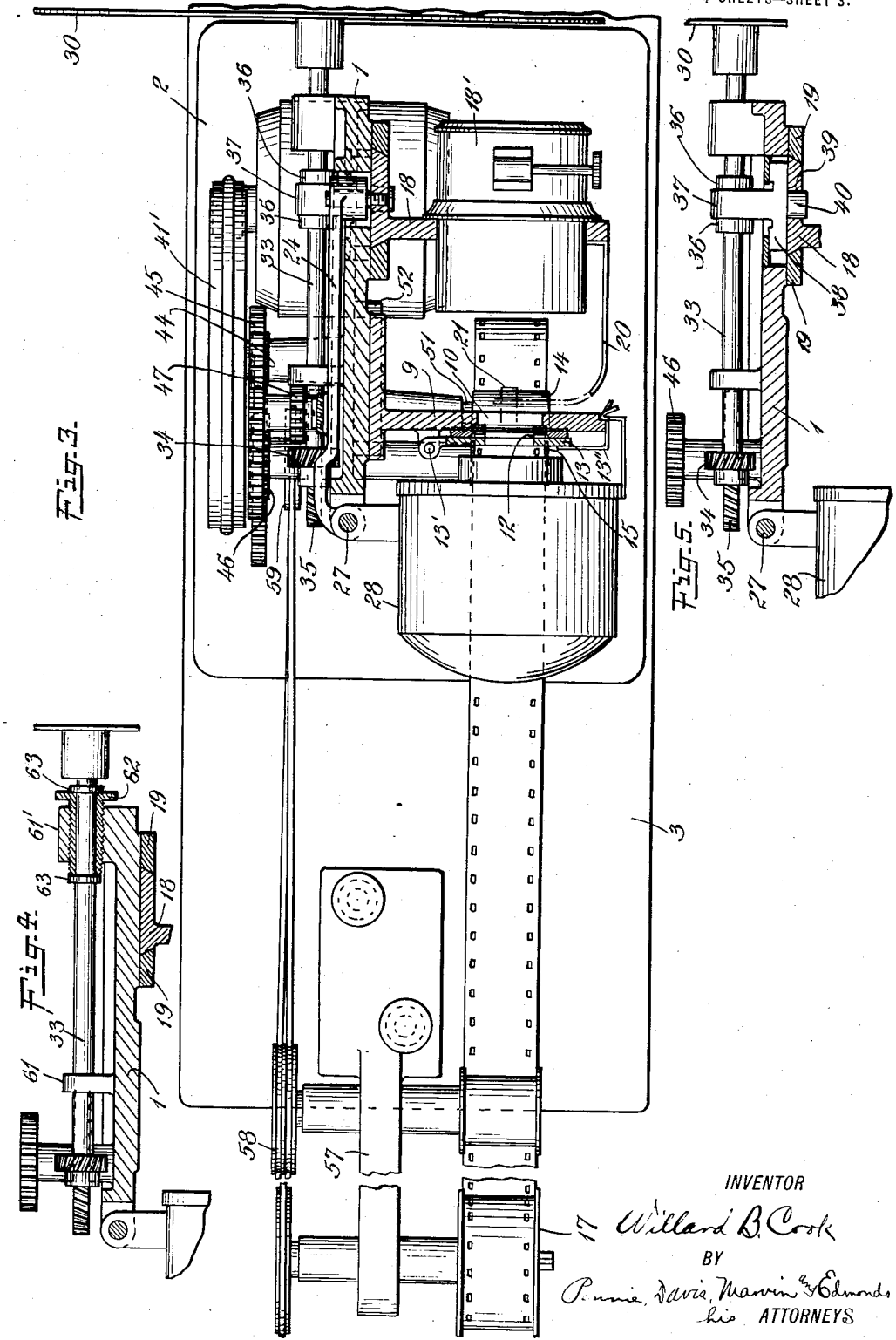

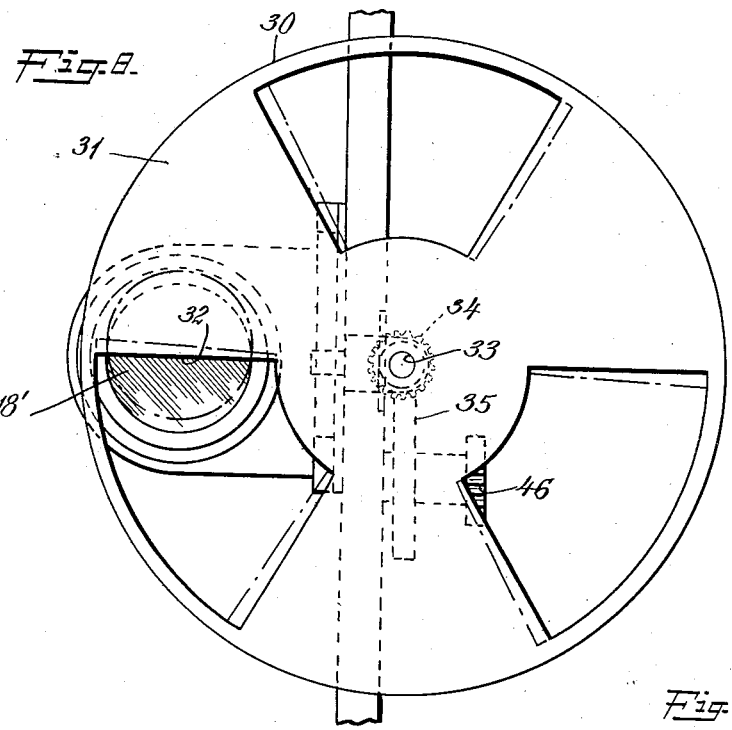
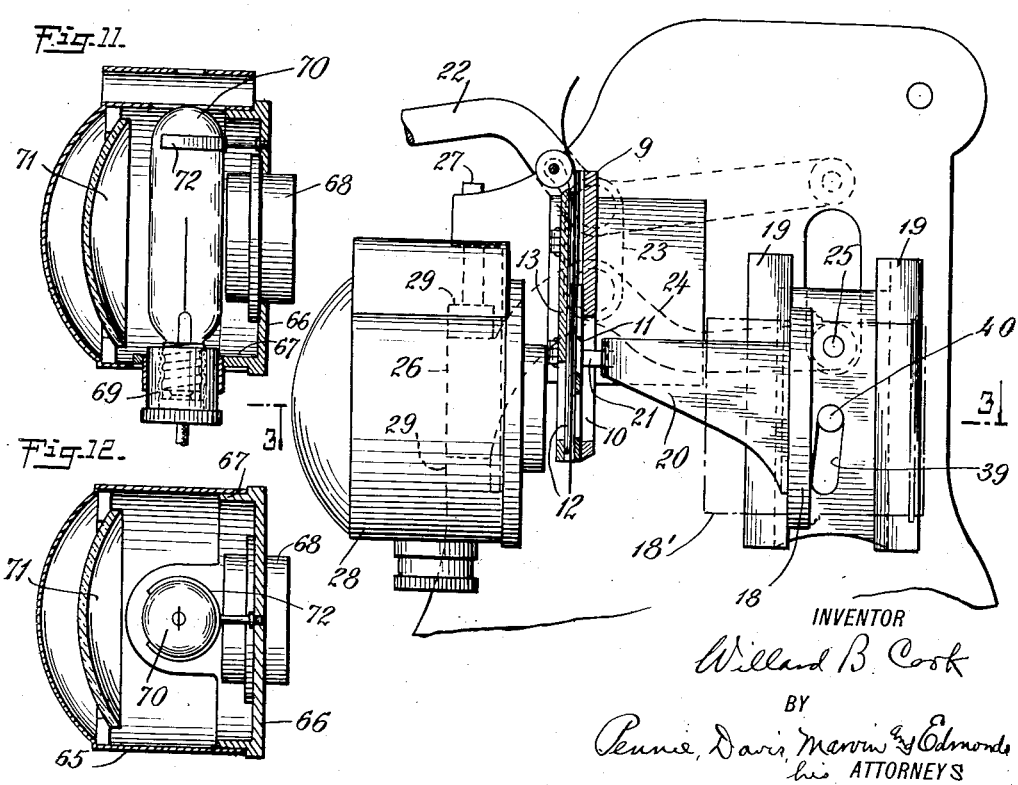

UNITED STATES PATENT OFFICE.

WILLARD B. COOK, OF NEW ROCHELLE, NEW YORK.

MOVING-PICTURE MACHINE.

1,404,013.  Specification of Letters Patent.  Patented Jan. 17, 1922.

Application filed February 19, 1918.  Serial No. 218,149.

*To all whom it may concern:*

Be it known that I, WILLARD B. COOK, a citizen of the United States, residing at New Rochelle, in the county of Westchester, State of New York, have invented certain new and useful Improvements in Moving-Picture Machines; and I do hereby declare the following to be a full, clear, and exact description of the invention, such as will enable others skilled in the art to which it appertains to make and use the same.

This invention relates to motion picture projecting apparatus and has for its object to improve an apparatus of that character in several important particulars to render the machine less liable to get out of order in the hands of inexperienced operators and more readily adjustable to compensate for wear of the parts and discrepancies in the film so that an exhibition of high quality may be given as readily by an amateur as by a skilled professional operator.

With this end in view, my invention comprises improvements in the framing device of the machine whereby the mask, or plate having the projection aperture, is adjusted relatively to the picture, at the same time adjusting the lens and lamp with the mask—that is to say, all the elements of the optical system are adjusted in synchronism so that the movement on the screen of the illuminated portion is equal merely to the actual vertical movement of the parts instead of a magnification of that movement as heretofore, due to the relative angular adjustment of the projection opening and the optical system. The greatest framing movement ever necessary is the height of a single picture, that is, three quarters of an inch or less and a variation of this small amplitude in the position of the illuminated portion of the screen is not perceptible to the audience.

My improved framing mechanism also provides an arrangement so that the shutter will be revolved to maintain the leading edge of the blade in proper synchronism with the intermittent movement at all positions of framing adjustment, thereby obviating the "ghost" effect which would otherwise be produced unless the shutter blade was of materially greater size than necessary to cut off the light during the period of movement of the film.

A further object of the invention is to provide an improvement in the mounting of the intermittent gear for operating the feeding sprocket whereby the two parts of the gear are readily adjustable to take up wear between their locking surfaces by the manipulation of a single adjusting screw and without taking down or otherwise deranging the parts.

A further feature of the invention consists in the novel arrangement of the reel support for the film which permits the machine to be used with equal convenience with either an incandescent light for pictures of comparatively small magnification or a very high powered electric arc for pictures of the usual professional size.

Other features of my invention reside in the manner of centering the incandescent lamp to obtain an accurate setting of the light with respect to the condensers and reflector regardless of variations and eccentricities which are common in commercial bulbs.

My invention also comprises various other features and improvements which will be more fully pointed out hereinafter.

In the accompanying drawings I have illustrated a projecting apparatus embodying the several features constituting my invention in the form preferred by me, but it will be of course understood that the details therein disclosed may be variously modified without departing from the spirit and scope of the invention.

In the said drawings,

Fig. 3 is a horizontal sectional view on the line 3—3 of Fig. 2;

Figs. 4 and 5 are horizontal sectional detail views of portions of Fig. 3 showing different features of the framing mechanism;

Fig. 7 is a side elevation of the framing mechanism looking from the side of the machine shown in Fig. 1;

Fig. 8 is a front elevation showing the relative position of the shutter and lens opening;

Figs. 9 and 10 are detail views of the intermittent mechanism; and

Figs. 11 and 12 are sectional details showing the bulb-centering device.

Figure 1:
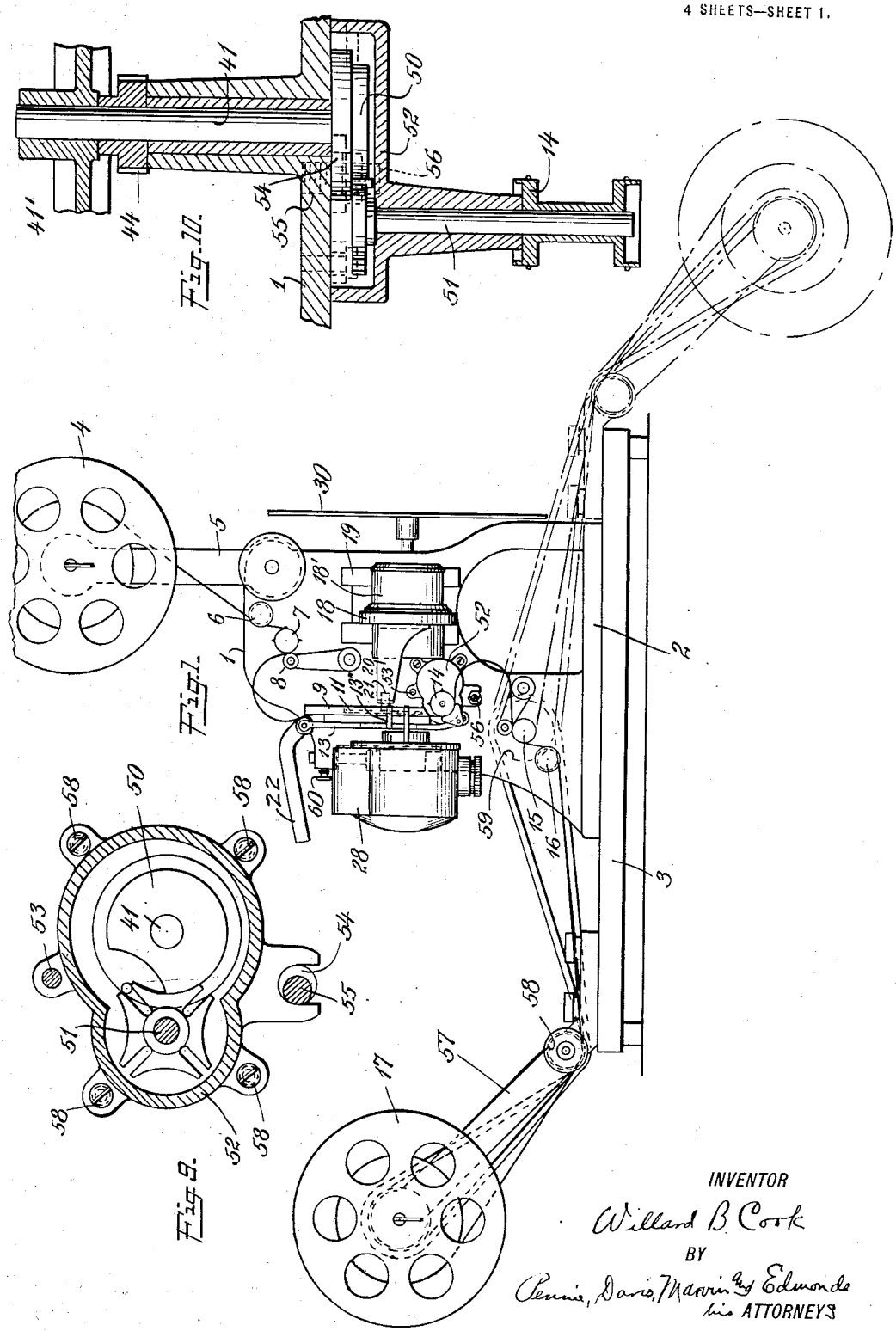
Figure 1 is a side elevation on a small scale showing the general arrangement of the parts constituting my improved machine.

Referring to the drawings, particularly Fig. 1, it will be noted that the various film feeding elements as well as the optical elements of the projecting machine are supported on a single vertical plate or standard 1 as is common in machines of this kind, this plate having a horizontal base portion 2 which is supported on the stand or table 3 of the projecting apparatus.

The film-supporting and feeding devices comprise upper reel 4 for the supply of film to be projected, the reel being supported on the vertical bracket arm 5 pivotally attached at its lower end to the top of standard 1 in such manner that the reel-supporting arm may be detached or folded down adjacent the standard 1, when the machine is not in use.

The film passes from the reel 4 over the guide roller 6 and thence under the upper feed sprocket 7, which sprocket is driven continuously from the gearing of the machine which will be later described. The film is held against the sprocket 7 by means of the usual swinging guide roller 8 and from the sprocket the film is directed upward in the form of a loop and thence downwardly through the tension guides which press the film feed against the aperture plate 9 and maintain it stationary during the projection.

The aperture plate 9 projects at right angles to the standard 1 to which it is fixedly attached and is provided with an aperture or light opening 10 equal in height to the height of at least two pictures, to permit the full range of framing adjustment necessary for all positions of the film. Mounted on the aperture plate for vertical adjustment with relation thereto is a supplemental plate or mask 11 having an opening equal to the dimensions of a single picture, whereby the lighted area of the screen may be limited to a single picture. The mask 11 is in a suitable recess in the face of the plate 9 and is held in place for vertical adjustment by means of a pair of film tracks attached to the plate 9 and overlying the edges of the mask, and against which the film is held by the usual tension guides 12 attached to the inner face of the gate 13. The gate is closed against the film as the machine is threaded to hold the film in place, the gate being hinged as shown at 13' in Fig. 3 to the rear face of the plate 9 and held closed by a spring catch 13".

The film passes downward between the plate and gate to the intermittent sprocket 14 supported on the standard 1, and thence to the lower sprocket 15 with the usual interposed loop in the film between the two sprockets. The film is held against the sprocket 15 by the usual guide roller and from the sprocket 15 passes around an idle roller 16 and thence to the take-up reel 17.

The framing of the picture is accomplished by adjusting the mask 11 to coincide with the picture on the film at its interval of rest during which the projection takes place. When the mask alone is adjusted as in the early projecting machines, the center of the mask is adjusted out of the optical axis of the projecting lens and the picture on the screen is displaced to an extent depending upon the angular departure of the center of the mask from the optical axis. That is to say, the displacement of the picture on the screen is magnified to the same extent that the picture is magnified by the projection, thus producing a displacement of considerable extent which may amount to several feet in pictures of usual size. To obviate this difficulty I provide for adjusting the projecting lens in synchronism with the mask and also adjusting the lamp house so that the center of the aperture will be maintained in the optical axis of the condensers and projecting lenses in all positions of framing adjustment. To this end the projecting lens 18' is supported in a frame 18 mounted for vertical adjustment in suitable guides 19 on the face of the standard 1. the plate or mask being connected through an arm 20 projecting rearwardly from the frame 18 and engaging a pin 21 on the mask 11.

Figure 2:
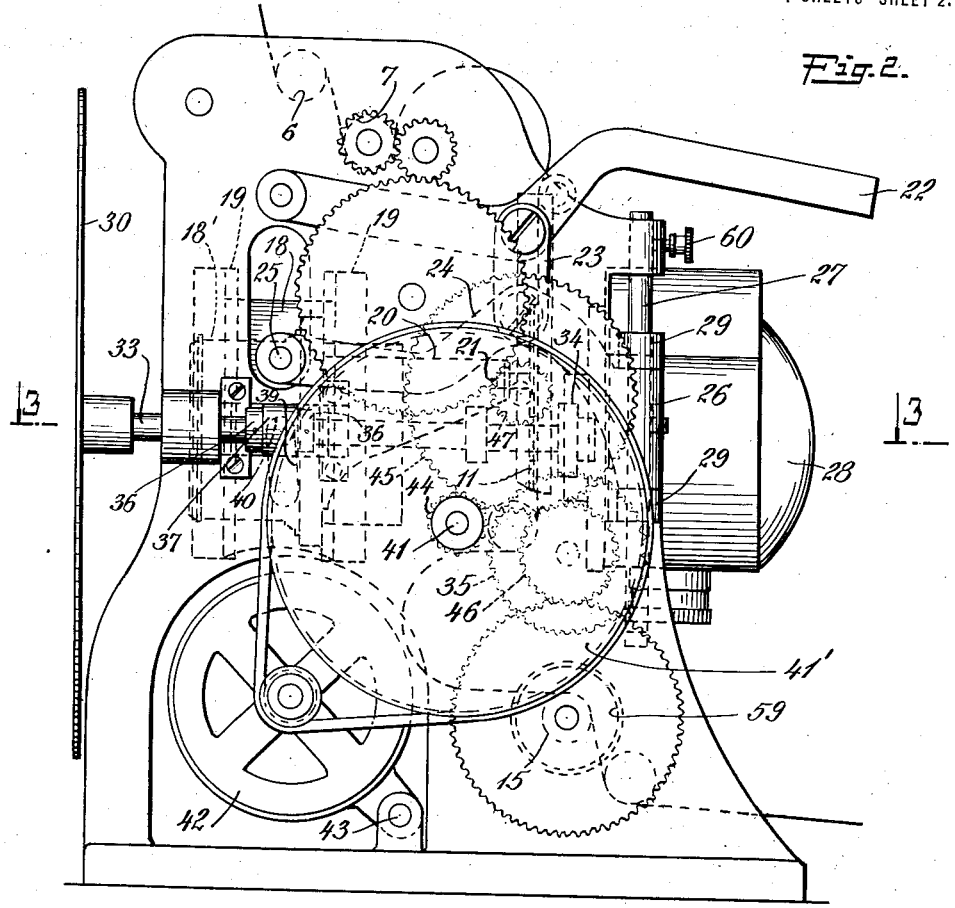
Fig. 2 is a side elevation on a much larger scale showing the side of the machine opposite to that shown in Fig. 1.

The adjustment of the carriage 18 and with it the lens and mask is effected by means of a framing lever 22 pivoted on the standard 1 and provided with a link 23 connected to a second lever or arm 24 parallel with the lever 22 as shown more particularly in Figs. 2, 3 and 7. The arm or bar 24 is swung from the link 23 at a point between its ends and is pivoted at one end as indicated at 25 (Fig. 2) to the carriage 18 which supports the projection lenses, and at its other end is provided with a sleeve 26 attached to a vertical rod 27 which forms the hinge pin of the lamphouse 28 in which the incandescent lamp for projecting the pictures is supported.

The rod 27 is mounted for vertical adjustment in guideways on the standard 1 and a milled thumb screw 60 is provided for holding the rod in adjusted position. If desired the screw may be adapted to apply sufficient friction to hold the rod after adjustment without locking it against movement through the operating handle.

The lamphouse 28 is swung on the rod 27 by means of two spaced collars 29 between which the sleeve 26 fits after the manner of the parts of a hinge. The rod 27 is of sufficiently greater length than the space occupied by the collars 29 for the entire lamphouse to be vertically adjustable to a distance equal to at least the full framing adjustment provided for the mask 11. The rod 27 serves as a guide for the arm 24 so that it will be raised bodily by the framing lever 22. That is to say, there will be no pivotal movement of the arm during the framing adjustment, and the lens and the lamphouse and the mask 11 will all be adjusted in synchronism to the same distance, thereby merely raising or lowering the optical axis, as the case may be, without changing the angle of projection so that the total movement of the picture on the screen will be no greater than the actual framing adjustment, which need not be more than a fraction of an inch.

In order that the shutter blade which cuts off the light from the film during the moment that the film is advanced to change the picture at the aperture, may be as narrow as possible to obscure the full period of movement, I provide means operating in synchronism with the framing mechanism to rotatively adjust the shutter in synchronism with the framing to maintain the relation of the advancing edge of the light opening in the same relation to the optical axis of the apparatus at all positions of framing adjustment. Fig. 8 shows the position of the shutter with relation to the lens 18'. The shutter, which is indicated at 30, is here shown as a three-wing shutter with all of the wings of equal width. It will be assumed that the wing 31 is the wing which obscures the movement of the film. The advancing edge 32 of this wing is shown in line with the center of the lens 17. If, now, the lens be raised without shifting the shutter, it will be obvious that the change in position of the wing and the lens will cause the shutter to begin to cut off the light in advance of the time that it had heretofore, with the result that unless the wing were of greater width than absolutely necessary to obscure the movement of the film, the rear edge of the shutter would begin to cross the path of the light before the movement of the film was complete, with the production of the so-called "ghost" effect in the picture.

Figure 6:
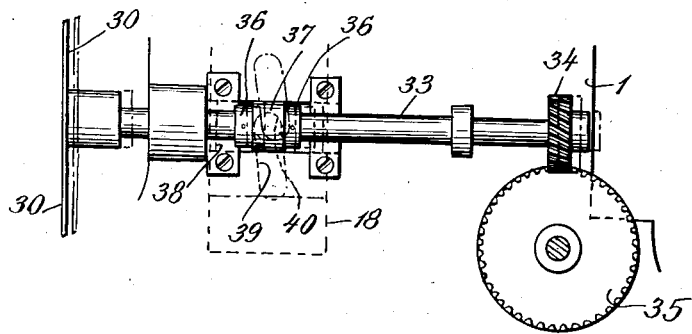
Fig. 6 is a side elevational view of a portion of the mechanism showing particularly the arrangement for adjusting the shutter blade to maintain the shutter in synchronism with the film feed.

To obviate this defect I provide the means for adjusting the shutter shown in detail in Figs. 4, 5 and 6. As here shown, the shutter is attached to the end of the horizontal shutter shaft 33 supported in bearings on the outer face of the standard 1, the shaft being continuously driven through a spiral gear 34 from a corresponding gear 35 driven from the shaft of the machine. The shaft 33 is mounted for longitudinal adjustment in its bearings and is provided with a pair of collars 36 fixed to the shaft and retaining between them an ear 37 projecting from a plate 38 supported in a recess in the standard 1 for sliding movement in a horizontal direction parallel with the direction of the shaft 33, the arrangement being such that the shaft 33 will be adjusted longitudinally with the plate 38.

The adjustment of the plate 38 is secured by means of a cam slot 39 in the bracket 18 which supports the projecting lens, the cam slot embracing a pin 40 which projects from the face of the plate 38. The inclination of the cam slot to the vertical is correlated with the inclination of the spiral teeth of the shutter driving gears 34, 35, so that the longitudinal movement of the shaft as effected by the cam slot will produce through the movement of the gear 34 with relation to the teeth of the gear 35, an angular movement of the shutter of proper extent to maintain the leading edge of the shutter wing in the same relative position with respect to the optical axis of the apparatus. The movement of the shutter shaft necessary to effect this adjustment is quite small, as indicated by the full line and broken line positions of the parts shown in Fig. 6.

Any preferred arrangement of gears may be employed for operating the various parts of the machine, but I have found the gearing illustrated in the drawing to be particularly applicable for a machine designed for amateur or home use. This gearing comprises a main driving shaft 41 at the outer end of which is supported a large driving pulley 41' driven from a driving motor 42, here shown as swung from a pivot 43 on the base of the machine in such manner that the weight of the motor is supported by the belt so as to maintain an even driving tension on the belt. The shaft 41 carries a pinion 44 which drives a gear 45 from which the shutter operating gear 35 is driven through an intermediate gear 46 on the same shaft. The gear 46 also operates the driving gear of the lower feed sprocket 15 while the upper feed sprocket is driven from a pinion 47 on the shaft of the gear 45 through suitable idlers illustrated in Fig. 2.

The intermittent sprocket is driven from the shaft 41 through a Maltese cross or Geneva movement operating to advance the sprocket one quarter of a revolution at each complete revolution of the shaft 41, the arrangement being such that the sprocket will be in operation during a portion of the movement of the shaft 41 and will be at rest during the remaining period. One feature of my invention resides in the mounting of the Geneva gear so that the parts of the latter may be relatively adjusted without opening the gear casing or disturbing the relation of any of the driving gears. To this end the driving member or pin wheel 50 of the Geneva couple is supported on the end of the shaft 41 with its face closely adjacent the standard 1. The driven shaft 51 of the geneva is supported in a gear casing 52 which encloses the Geneva couple and is ground to have an oil-tight fit against the face of the standard 1. The gear casing 52 is pivotally supported on a pin 53 so as to be capable of a slight swinging movement across the face of the standard 1. The pin 53 is located substantially above the point of contact of the driving and driven members of the Geneva gear so that swinging movement of the casing in which the shaft 51 has its bearing will vary the distance between the driving and driven shafts to thereby take up wear of the parts. The adjustment of the casing is preferably effected by means of an eccentric 54 supported on a pin 55 set in the face of the standard 1 beneath the gear casing and working in a fork projecting from the lower wall of the casing. The pin 55 is provided with a knurled knob 56 whereby it may be turned to effect the adjustment of the eccentric, and the outer end of the pin is threaded to receive a locking nut for locking the eccentric in adjusted position. The gear casing is also held in position by means of screws 58 passing through ears around the base of the gear casing and set in the standard 1. The holes in the ears through which the screws pass are slightly enlarged to permit the slight angular motion of the casing necessary to adjust the relative position of the two parts of the geneva. In adjusting the gear casing the screws 58 and the lock nut may be loosened and the knurled knob 56 slowly turned while the machine is slowly operated by hand until the lost motion is sufficiently taken up.

For amateur use it is preferable to employ an incandescent light mounted directly on the machine, as illustrated in the application drawings, as it requires no adjustment or manipulation to maintain a constant light. When a lamp of this kind is used the receiving reel 17 is preferably supported at the rear of the machine as shown in full lines in Fig. 1, the reel in this position being entirely above the base of the machine, so that the machine may be supported on any table or other flat surface.

It is desired, however, that the machine be capable of use with a high powered arc or other projecting lantern in order that larger and more brilliant pictures may be produced than possible with the small incandescent light. An arc lamp cannot be placed close to the film and its lamphouse must occupy the position normally occupied by the receiving reel 17 in order that the condensers may properly focus the light on the film. In order to permit the machine to be used with either type of light and without extra parts, the reel support and its driving mechanism are constructed to permit the adjustment of the reel to a position in front of the machine beneath the plane of the shutter, as indicated in broken lines.

The reel support consists of a bracket arm 57 having a flat horizontal portion for attachment to the machine. The base 3 of the machine is provided with holes in both its front and rear edges spaced to fit the holes in the horizontal portion of the bracket. The arm 57 and both faces of the horizontal portion are machined off to fit flat against the base so that the arm may be clamped in the upright full line or the inverted broken line position. In order that the same driving belt may be used in either position of adjustment a double idler 58 is attached to the arm adjacent the bend so that when the belt is trained over the idlers its path from the driving pulley 59 on the shaft of the lower sprocket will be the same in either position of adjustment of the bracket.

To remove the incandescent light when the high powered light is to be used, the pin 27 on which the lamphouse 28 is supported is detached by merely loosening the thumb nut 60 and withdrawing the pin. The pin 27 will then be replaced as a guide for the framing arm 24 so that the latter will continue to effect a synchronous adjustment between the projecting lens and the mask. With the arc light the area of illumination at the aperture may be sufficiently large to require no adjustment of the light for different positions of the mask.

Instead of having the shutter adjusted in synchronism with the framing, I may provide independent adjustment for the shutter so that the adjustment may be utilized to take up wear of the shutter gears or other discrepancies as well as adjust the shutter to conform to the framing adjustment. This modification is shown in detail in Fig. 4. The shutter shaft 33' is supported adjacent the face of the standard 1 by journal boxes 61, 61', one of which (61'), is counterbored to receive a bearing sleeve 62 which is threaded in the counterbored journal box and provided with a knurled flange to permit its ready adustment in the box. The ends of the sleeve 62 are retained between collars 63 attached to the shutter shaft so that the shutter shaft will be adjusted longitudinally by the rotary adjustment of the bearing sleeve to thereby cause a rotary adjustment of the shutter shaft due to the spiral teeth of the shutter gears which are the same in this form of the device as in the previously described construction.

In designing the machine for the use of ordinary commercial incandescent bulbs I have found that such bulbs are not accurately constructed, particularly in regard to the attachment of the threaded base to the glass globe, so that when the proper positioning of the socket support is relied upon solely for positioning the filament with respect to the reflector and condensers, the filament of one bulb will not necessarily be positioned at the same point as the filament of the next bulb that may be used, and unless the reflectors, condensers and parts generally of the lamp are adjustable, it is impossible to obtain proper focusing of the light.

I have discovered, however, that the filament is nearly always properly centered in the bulb, that is to say, that the circle formed by a cross section through the bulb would have its center at the center of the filament so that if the bulb be centered by means of its glass portion instead of its threaded stem, the filament will lie at the focus of the condensers without necessitating that the condensers, reflectors, etc. be made adjustable.

To this end I have designed the lamphouse construction shown in Figs. 11 and 12. This construction comprises an outside housing or casing 65, the front wall 66 of which is detachable and is held in place by means of a flange 67 fitting within the side walls. The condensers 68 are set in the front wall and the flange 67 at the bottom is extended rearwardly to a sufficient extent to support the socket 69 in which the bulb 70 is secured, the arrangement being such that the front wall may be removed like the lid of a box and carry with it the bulb and condensers. The reflector 71 is supported adjacent the rear wall of the housing opposite the condensers and the top wall is provided with an air space for cooling and ventilating purposes, as is usual in lamps of this character.

Electric light bulbs are threaded so as to be loose in their sockets until the bulb is screwed home against the contact. The diameter of the socket is greater than that of the bulb, as indicated in dotted lines in Fig. 11, and this looseness allows the bulb head an appreciable angular movement in the socket without damage as it is screwed in, and also allows the bulb to be clamped against the contact to make a good electrical connection in any angular position of the threaded head within its amplitude of play.

The bulb may thus be centered in the socket by its globe, which is accomplished by means of the bulb-holding fork or ring 72 supported on a stem in the front wall of the housing above the condensers. The diameter of the ring corresponds with the external diameter of the bulb and is so positioned that a line drawn from the center of the ring to the center of the socket will lie in the focal plane of the condensers. The bulb is held in the socket by thrusting it through the ring until its threaded stem reaches the thread of the socket and then turning the bulb to screw the thread into the socket, the bulb head adjusting itself angularly in its socket to compensate for any irregularity in the attachment of the stem to the bulb. In this way the filament which, as before explained, is almost always properly centered with respect to the glass bulb, will be maintained in the focal plane and ordinary commercial bulbs may be used without sacrificing the quality of the picture.

I have described the mechanism of the machine with some particularity of detail for the reason that the machine disclosed represents a commercial machine which has been found to be very satisfactory in operation and which, I believe at the present time to represent the best embodiment of my invention. It is, however, to be understood that the invention is not limited in any sense to the particular construction shown and described, except in so far as that structure is recited in the appended claims.

Claims:

1. In a machine of the character described, the combination of a shaft to be intermittently driven, a driving shaft therefor, cooperating power transmitting members on said shafts for effecting an intermittent motion of the driven shaft, a bearing for one of said shafts, a casing enclosing said power transmitting members, a bearing for said other shaft on said casing, and means for effecting a relative movement of said casing and said first mentioned bearing to adjust said cooperating members to compensate for wear of their cooperating faces.

2. In a machine of the character described, the combination of a shaft to be intermittently driven, a driving shaft therefor, cooperating power transmiting members on said shafts for effecting an intermittent motion of the driven shaft, a bearing for one of said shafts, a casing enclosing said power transmitting members, a bearing for said other shaft on said casing, a pivotal connection between said casing and the support of said first mentioned bearing, said pivot being eccentric to both said shaft bearings, and means for relatively adjusting said casing and shaft bearing support about said pivot to thereby adjust the cooperating faces of the power transmitting members to compensate for wear.

3. In a machine of the class described, the combination of a standard for supporting the film moving parts, a driving shaft having a fixed bearing in said standard, an intermittently operated sprocket for advancing the film, and means for driving said sprocket from said shaft comprising a Geneva couple having its driving member connected to said shaft and its driven member connected to said sprocket, a casing enclosing said Geneva couple and providing a bearing for said driven member and sprocket, said casing being mounted for adjustment on said standard in a direction to vary the distance between the co-acting faces of the Geneva couple to compensate for wear.

4. In a machine of the class described, the combination of a standard for supporting the film moving parts, a driving shaft having a fixed bearing in said standard, an intermittently operated sprocket for advancing the film, means for driving said sprocket from said shaft comprising a Geneva couple having its driving member connected to said shaft and its driven member connected to said sprocket, a casing enclosing said Geneva couple and providing a bearing for said driven member and sprocket, said casing being pivotally supported on said standard at a point eccentric to both members of said couple, and means for adjusting said casing on its pivot to take up wear between the contacting faces of the Geneva couple, said means comprising a projection on said casing having a slotted portion and an eccentric embraced by said slot to thereby effect a slight pivotal movement of said casing upon rotation of said eccentric.

5. In a machine of the class described, the combination of a standard for supporting the film moving parts, a driving shaft having a fixed bearing in said standard, an intermittently operated sprocket for advancing the film, means for driving said sprocket from said shaft comprising a Geneva couple having its driving member connected to said shaft and its driven member connected to said sprocket, a casing enclosing said Geneva couple and providing a bearing for said driven member and sprocket, said casing being pivotally supported on said standard at a point eccentric to both members of said couple, and means for adjusting said casing on its pivot to take up wear between the contacting faces of the Geneva couple, said means comprising a projection on said casing having a slotted portion and an eccentric supported on said standard and a series of clamping screws for maintaining said casing in fluid-tight contact with said standard, said screws having a lost motion engagement with said casing to permit its adjustment when said screws are loosened.

6. In a moving picture machine the combination of a projecting mechanism embodying a machine frame and film moving parts, a take-up reel for the film, a bracket for the take-up reel comprising two parts angularly disposed, one of said parts being adapted to support the reel and the other to be attached to the base of the machine frame, said latter part being shaped on its opposite faces to position the bracket so as to support the reel above the base of the machine when one of said faces is in contact with the base and to support the reel below the base when the other said face is in contact with the base of the machine.

7. In a moving picture machine the combination of a projecting mechanism embodying a machine frame and film moving parts, a takeup reel for the film, a bracket for the take-up reel comprising two parts angularly disposed, one of said parts being adapted to support the reel and the other to be attached to the base of the machine frame, said latter part being shaped on its opposite faces to position the bracket so as to support the reel wholly above the base and to the rear of the machine when one of said faces is in contact with the base and to support the reel wholly below the base and in front of the machine when the other said face is in contact with the base of the machine.

8. In a moving picture projecting machine the combination of a film feeding mechanism, a mask or aperture plate for defining the outline of the projected picture, a projecting lens, means for adjusting said lens and plate relatively to said film-moving mechanism to frame the picture, a shutter-driving mechanism supported in fixed relation to the film-driving mechanism, and means for adjusting said shutter simultaneously with the adjustment of said lens and plate to maintain the time of operation of the shutter the same for different positions of framing adjustment.

9. In a moving picture machine the combination of a film feeding mechanism, a stationary frame for supporting said mechanism, a projecting lens, a mask for defining the illuminated area, a source of light, means for vertically adjusting in synchronism said lens, mask and source of light with relation to the picture strip to frame the picture and maintain the axis of the optical system at a fixed angle to the screen in different positions of adjustment, a shutter for periodically intercepting the light through said film, and means for adjusting said shutter in synchronism with said elements to maintain its time of light interruption the same for different positions of framing adjustment.

10. In a moving picture machine the combination of a film feeding mechanism, a stationary frame for supporting said mechanism, a projecting lens, a mask for defining the illuminated area, a source of light, means for vertically adjusting in synchronism said lens, mask and source of light with relation to the picture strip to frame the picture and maintain the axis of the optical system at a fixed angle to the screen in different positions of adjustment, a shutter supported on said fixed frame, means for rotating the shutter, and means operated by said framing adjustment for rotatably adjusting said shutter to maintain its time of light interruption the same for different positions of framing adjustment.

11. In a moving picture machine the combination of a film feeding mechanism, a stationary frame for supporting said mechanism, a projecting lens, a mask for defining the illuminated area, a source of light, means for vertically adjusting in synchronism said lens, mask and source of light with relation to the picture strip to frame the picture and maintain the axis of the optical system at a fixed angle to the screen in different positions of adjustment, a shutter mechanism for periodically intercepting the light through the film comprising a shutter shaft mounted in fixed bearings on the frame, spiral gears for driving the shutter shaft, and means operated by said framing adjustment for longitudinally shifting said shutter shaft during the framing operation to thereby cause a rotative adjustment of the shutter shaft through said spiral gears.

12. In a moving picture projecting machine, the combination of a film feeding mechanism, a mask or aperture plate for defining the outline of the projected picture, means for adjusting said plate relatively to the film feeding mechanism, a rotating shutter for cutting off the light from the picture at the aperture, and means for adjusting said shutter simultaneously with said plate to maintain the time of operation of the shutter the same for different positions of the plate.

13. In a moving picture projecting machine, the combination of a film feeding mechanism, a mask or aperture plate for defining the outline of the projected picture, means for adjusting said plate relatively to the film feeding mechanism, a rotating shutter for cutting off the light from the picture at the aperture, and means for rotatively adjusting said shutter simultaneously with said plate to maintain the time of operation of the shutter the same for different positions of the plate.

14. In a moving picture projecting machine, the combination of a film feeding mechanism, a mask or aperture plate for defining the outline of the projected picture, a projecting lens, means for adjusting said plate and lens relatively to the film feeding mechanism, a rotating shutter for cutting off the light from the picture at the aperture, and means for adjusting said shutter simultaneously with said plate to maintain the time of operation of the shutter the same for different positions of the plate.

15. In a moving picture projecting machine, the combination of a film feeding mechanism, a mask or aperture plate for defining the outline of the projected picture, means for adjusting said plate relatively to the film moving mechanism to frame the picture, a rotatable shutter, a driving mechanism therefor, connections between said shutter and its driving mechanism whereby bodily movement of the shutter effects a rotative adjustment thereof, and means for shifting said shutter simultaneously with the adjustment of said mask to thereby effect a rotative adjustment of the shutter to maintain its time of operation the same for different positions of framing adjustment.

16. In a moving picture projecting machine, the combination of a film feeding mechanism, a mask or aperture plate for defining the outline of the projected picture, means for adjusting said plate relatively to the film moving mechanism to frame the picture, a rotatable shutter, a pair of spiral gears for driving said shutter, and means operating simultaneously with the framing adjustment for shifting one of said spiral gears to thereby effect a rotative adjustment of the shutter to maintain the time of operation of the shutter the same for different positions of framing adjustment.

In testimony whereof I affix my signature.

WILLARD B. COOK.